(12) United States Patent
Allen

(10) Patent No.: US 10,781,852 B1
(45) Date of Patent: Sep. 22, 2020

(54) MODULAR LABYRINTH BEARING ASSEMBLY

(71) Applicant: GM GLOBAL TECHNOLOGY OPERATIONS LLC, Detroit, MI (US)

(72) Inventor: Todd E. Allen, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/658,955

(22) Filed: Oct. 21, 2019

(51) Int. Cl.
```
F16C 27/02      (2006.01)
F16C 17/02      (2006.01)
F16C 17/26      (2006.01)
B62D 1/16       (2006.01)
```

(52) U.S. Cl.
CPC .............. *F16C 17/02* (2013.01); *F16C 17/26* (2013.01); *F16C 27/02* (2013.01); *B62D 1/16* (2013.01); *F16C 2208/70* (2013.01)

(58) Field of Classification Search
CPC .......... F16C 17/02; F16C 17/26; F16C 27/02; F16C 27/063; F16C 2326/24; B62D 1/16
See application file for complete search history.

(56) References Cited

U.S. PATENT DOCUMENTS

| | | | | |
|---|---|---|---|---|
| 3,985,061 A | * | 10/1976 | Montgomery | F16C 29/02 89/43.01 |
| 5,669,718 A | * | 9/1997 | Sakairi | B62D 1/16 384/220 |
| 6,416,226 B1 | * | 7/2002 | Provence | F16C 27/063 384/220 |
| 8,696,207 B2 | * | 4/2014 | Tange | F16C 29/02 384/215 |
| 9,145,160 B2 | * | 9/2015 | Domig | F16C 29/002 |

FOREIGN PATENT DOCUMENTS

| | | | | |
|---|---|---|---|---|
| DE | 102016114678 A1 | * | 2/2018 | F16C 17/02 |
| GB | 805538 A | * | 12/1958 | F16C 27/063 |

* cited by examiner

*Primary Examiner* — Phillip A Johnson

(57) ABSTRACT

A bearing assembly includes a first race member with a first annular body with a first inner diameter and a first outer diameter. The first race member has a first attachment feature and a first protuberance extending inboard of the first attachment feature. A second race member has a second annular body with a second inner diameter and a second outer diameter. The second race member has a second attachment feature and a second protuberance extending inboard of the second attachment feature. The first attachment feature is coupled to the second attachment feature such that the first protuberance is spaced axially from the second protuberance with a channel defined therebetween. The channel extends obliquely relative to a central axis of the first race member and the second race member. A ring member has an annular frustoconical body disposed in the channel which extends obliquely relative to the central axis.

17 Claims, 3 Drawing Sheets

(Detail)

MODULAR LABYRINTH BEARING ASSEMBLY

INTRODUCTION

The present disclosure relates generally to bearing assemblies for supporting rotatable shafts.

A steering column assembly for an automobile or other steerable vehicle may include a rotatable steering shaft that is supported by one or more steering column bearing assemblies. A typical steering column bearing assembly includes an inner race, an outer race, and ball bearings disposed therebetween to allow relative rotation of the races. Such a bearing assembly may generate undesirable noise from the steering column assembly.

SUMMARY

A bearing assembly according to the present disclosure includes a first race member, a second race member, and a ring member. The first race member has a first annular body with a first inner diameter and a first outer diameter. The first race member has a first attachment feature and a first protuberance extending inboard of the first attachment feature. The second race member has a second annular body with a second inner diameter and a second outer diameter. The second race member has a second attachment feature and a second protuberance extending inboard of the second attachment feature. The first attachment feature is coupled to the second attachment feature such that the first protuberance is spaced axially from the second protuberance with a channel defined therebetween. The channel extends obliquely relative to a central axis of the first race member and the second race member. The ring member has an annular frustoconical body disposed in the channel which extends obliquely relative to the central axis.

In an exemplary embodiment, the second race member additionally includes a third attachment feature. In such an embodiment, the assembly further includes a third race member having a third annular body with a third inner diameter and a third outer diameter. The third race member has a fourth attachment feature and a third protuberance extending inboard of the fourth attachment feature. The fourth attachment feature is coupled to the third attachment feature such that the third protuberance is spaced axially from the second protuberance with a second channel defined therebetween. The second channel extends obliquely relative to the central axis. The assembly also includes a second annular frustoconical ring member disposed in the second channel. The second ring member extends obliquely relative to the central axis.

In an exemplary embodiment, the assembly additionally includes a rotatable shaft, with the ring member being disposed about and having an interface with the rotatable shaft. In such embodiments, the ring member may have a second interface with the first protuberance and a third interface with the second protuberance.

In an exemplary embodiment, the ring member includes polytetrafluoroethylene or polyester.

In an exemplary embodiment, the first attachment feature includes a first resilient interlockable tab and the second attachment features includes a second resilient interlockable tab.

In an exemplary embodiment, the first race member and the second race member have a same cross-sectional profile.

A method of assembly according to the present disclosure includes providing a rotatable shaft, and disposing a first annular race member about the shaft at a first axial location. The first race member has a first attachment feature and a first protuberance extending inboard of the first attachment feature. The method also includes disposing an annular ring member about the shaft proximate the first protuberance. The method additionally includes disposing a second annular race member about the shaft at a second axial location. The second race member has a second attachment feature and a second protuberance extending inboard of the second attachment feature. The method further includes coupling the first attachment feature to the second attachment feature to secure the first race member to the second race member with the ring member therebetween. The first protuberance and the second protuberance cooperatively define a channel therebetween with the ring member disposed therein.

In an exemplary embodiment, the second annular race member has a third attachment feature. In such embodiments the method additionally includes disposing a second annular ring about the shaft proximate the second protuberance. The method also includes disposing a third annular race member about the shaft at a third axial location. The third race member has a fourth attachment feature and a third protuberance extending inboard of the third attachment feature. The method further includes coupling the third attachment feature to the fourth attachment feature to secure the second race member to the third race member with the second ring member therebetween. The second protuberance and the third protuberance cooperatively define a second channel therebetween with the second ring member disposed therein.

In an exemplary embodiment, the ring member has a first interface with the rotating shaft, a second interface with the first protuberance, and a third interface with the second protuberance.

In an exemplary embodiment, the ring member comprises polytetrafluoroethylene or polyester.

In an exemplary embodiment, the first attachment feature includes a first resilient interlockable tab and the second attachment features comprises a second resilient interlockable tab. Coupling the first attachment feature to the second attachment feature comprises interlocking the first and second resilient tabs.

In an exemplary embodiment the first race member and the second race member have a same cross-sectional profile.

An automotive vehicle according to the present disclosure includes a rotating shaft, a first race member, a second race member, and a ring member. The first race member has a first annular body disposed about the rotating shaft. The first race member has a first inner diameter and a first outer diameter. The first race member has a first attachment feature and a first protuberance extending inboard of the first attachment feature. The second race member has a second annular body disposed about the rotating shaft. The second race member has a second inner diameter and a second outer diameter. The second race member has a second attachment feature and a second protuberance extending inboard of the second attachment feature. The first attachment feature is coupled to the second attachment feature such that the first protuberance is spaced axially from the second protuberance with a channel defined therebetween. The channel extends obliquely relative to a central axis of the first race member and the second race member. The ring member has an annular frustoconical profile. The ring member is disposed about the rotating shaft and positioned in the channel. The ring member extends obliquely relative to the central axis.

In an exemplary embodiment, the second race member further comprises a third attachment feature. In such embodiments, the assembly additionally includes a third race member having a third annular body with a third inner diameter and a third outer diameter. The third race member has a fourth attachment feature and a third protuberance extending inboard of the fourth attachment feature. The fourth attachment feature is coupled to the third attachment feature such that the third protuberance is spaced axially from the second protuberance with a second channel defined therebetween. The second channel extends obliquely relative to the central axis. A second annular frustoconical ring member is disposed in the second channel and extends obliquely relative to the central axis.

In an exemplary embodiment the rotatable shaft comprises a steering shaft extending from a steering wheel to a steering rack.

In an exemplary embodiment, the ring member has a first interface with the rotatable shaft, a second interface with the first protuberance and a third interface with the second protuberance.

Embodiments according to the present disclosure provide a number of advantages. For example, the present disclosure provides a bearing assembly having low turning torque and improved ergonomic assembly characteristics relative to known bearing designs.

The above advantage and other advantages and features of the present disclosure will be apparent from the following detailed description of the preferred embodiments when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
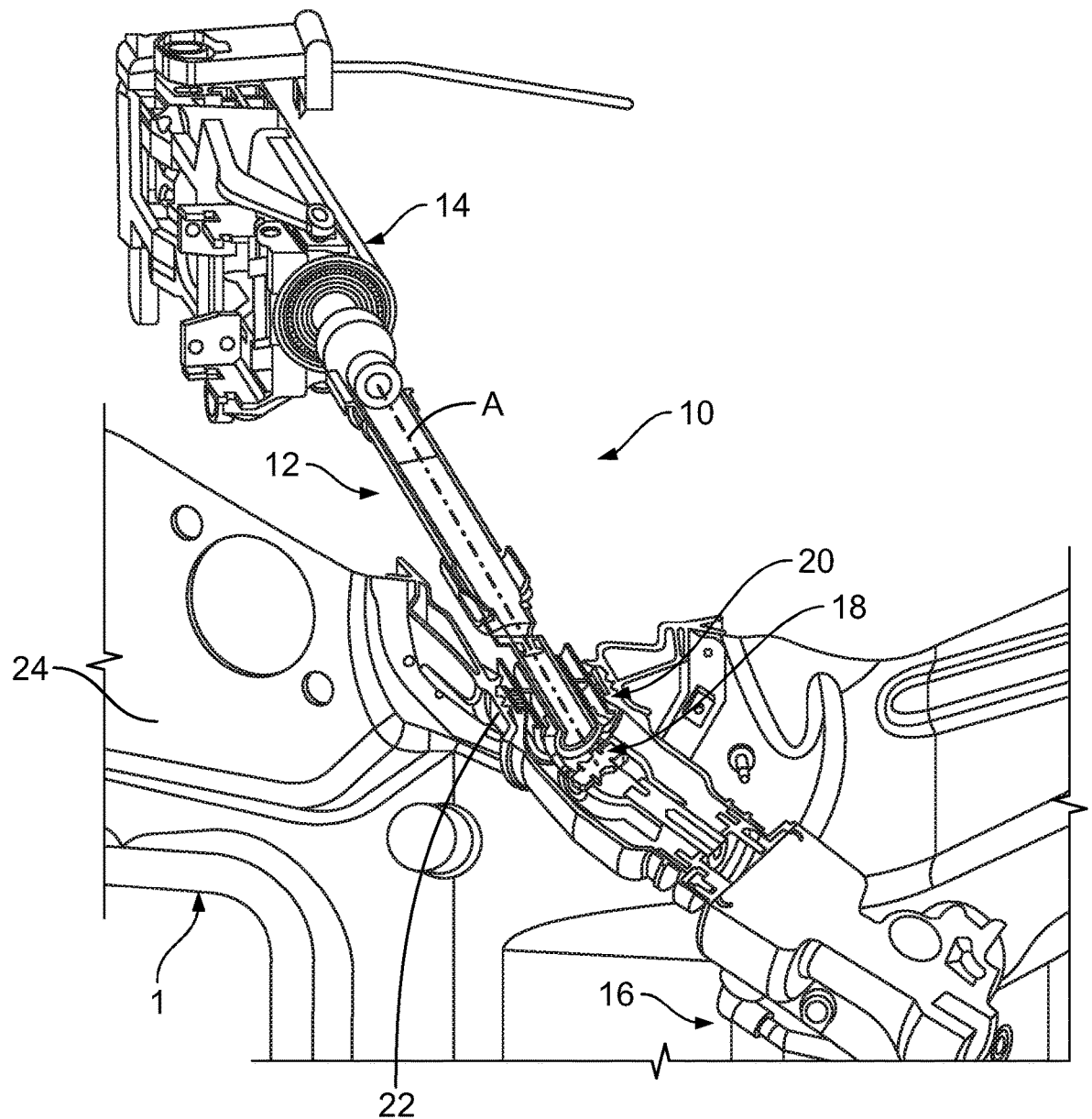
FIG. 1 is an illustration of vehicle having a bearing assembly according to an embodiment of the present disclosure.

FIG. 1 illustrates a steering column assembly 10 having a rotatable steering shaft 12 that may extend from a steering wheel (not shown) to a steering rack (also not shown). The steering column assembly 10 is applicable to be employed with a steering system of an automotive vehicle 1. Other steering column assembly configurations and applications are contemplated within the scope of the disclosure. The rotatable steering shaft 12 is suspended at an upper end by a support assembly 14 and at a lower end by a joint assembly 16, and is configured to rotate about an axis A. A U-joint 18 may be positioned intermediate of the rotatable steering shaft 12 and may be supported by a bearing assembly 20. In various embodiments, the bearing assembly 20 is located within a seal assembly 22 that is mounted to a vehicle bulkhead 24.

Figure 2:
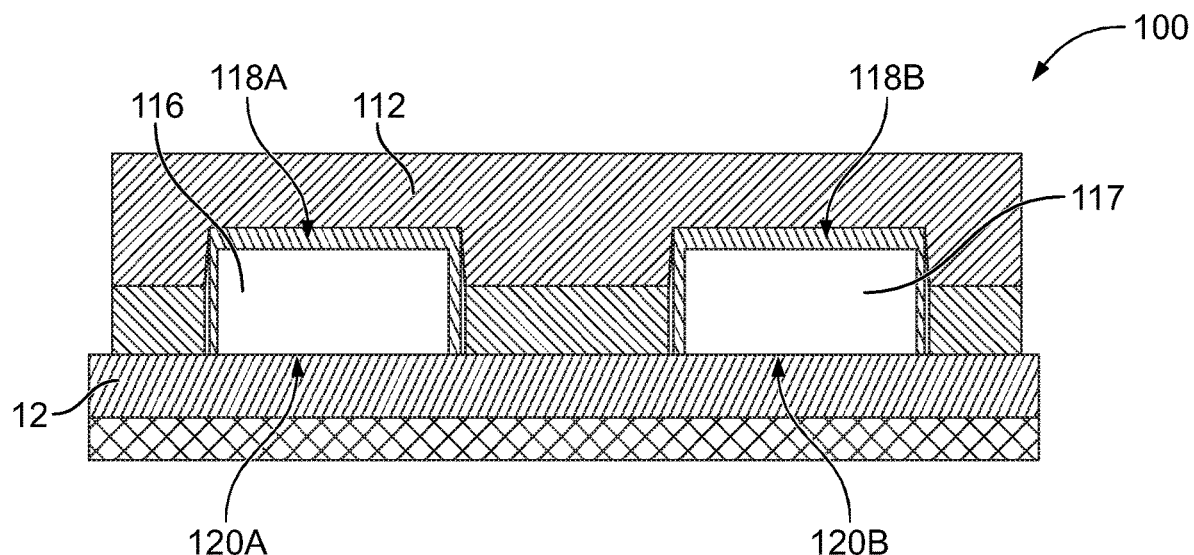
FIG. 2 is a cross-section of a prior art bearing assembly.

Known polymer bearing assemblies, such as the bearing assembly 100 shown in FIG. 2, may not provide superior noise impedance with low friction characteristics and acceptable ergonomics. The bearing assembly 100 includes a race 112 that extends circumferentially around at least a portion of the steering shaft 12 such that the steering shaft 12 is rotatably enclosed within the race 112. One or more bearing members or rings 116, 117 are disposed between the race 112 and the shaft 12 to reduce noise, for example. The bearing members 116, 117 have a first interface 118A, 118B with the race 112 and a second interface 120A, 120B with the shaft 12. Currently, to achieve acceptable ergonomic performance of the bearing assembly, the interfaces 118A, 118B, 120A, and 120B are loose.

Figure 4:
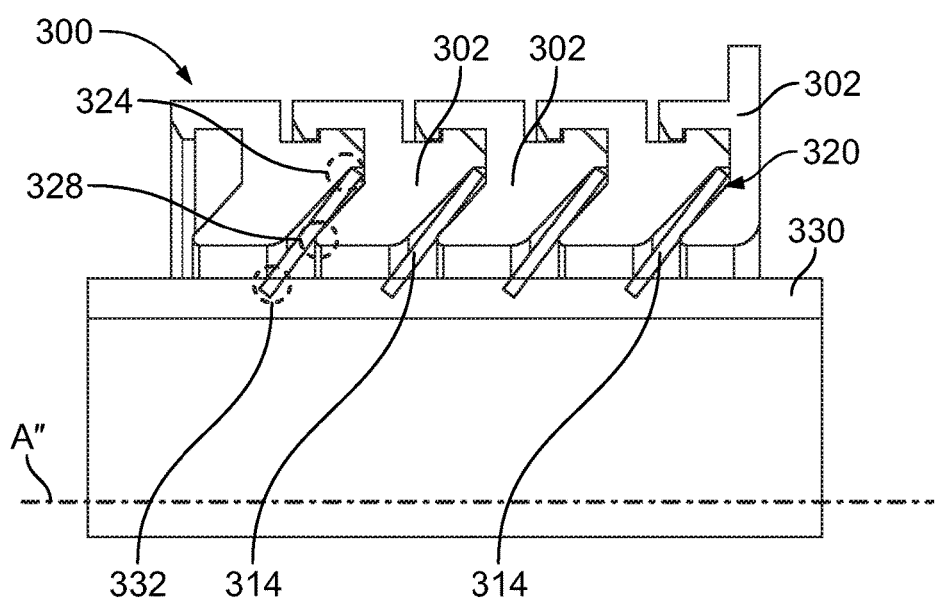
FIG. 4 is a cross-section of a bearing assembly according to an embodiment of the present disclosure.

A bearing assembly 200 having improved performance characteristics relative to known bearings, including reduced noise, low friction, and ergonomic assembly, is shown in FIGS. 3 and 4. The bearing assembly 200 is disposed about a rotatable shaft having an axis of rotation A'. In the embodiment of FIG. 1 the shaft and bearing assembly 200 may define the shaft 12 and bearing assembly 20, respectively; however, in other embodiments the shaft may be any other suitable rotating shaft in an automotive or non-automotive setting.

Assembly of the bearing assembly 200 is illustrated in FIGS. 3a through 3d. A first outer ring member 202, which may be referred to as a race member, is provided. The first race member 202 has a generally annular body having a cross-sectional profile as illustrated in FIGS. 3a through 3d. The first race member 202 comprises a connection portion 204 and a protuberance 206. The connection portion 204 is disposed outboard of the protuberance 206, relative to the axis of rotation A'. The first race member may be formed out of a variety of materials, such as plastic or metal. As will be discussed in further detail below, in some embodiments it may be advantageous for some portions of the race member 202 to have resilient properties. In such embodiments, the entire race member 202 may be formed out of a resilient material, e.g. through molding, or the race member 202 may be formed out of a combination of materials such as rigid and resilient materials, e.g. through multi-shot molding.

The connection portion 204 includes at least one attachment feature 208 configured to mechanically or otherwise engage with a complementary attachment feature 208 on an additional component, as will be discussed in further detail below. The attachment features 208 may comprise interlockable resilient tabs as illustrated in FIG. 3, or other attachment features, e.g. hooks and loops, surfaces provided with adhesive, or any other suitable attachment feature. In the exemplary embodiment, illustrated in FIG. 3, the connection portion 204 includes a first and second attachment features 208 having complementary shapes, such that multiple race members 202 may be sequentially coupled to one another, as will likewise be discussed in further detail below.

The protuberance 206 extends obliquely with respect to the axis A', such that the axial position of the protuberance 206 varies between the outermost and innermost diameters thereof. Stated differently, the protuberance 206 does not extend perpendicular to the axis A', but rather has an axially-varying profile. In the illustrated embodiment the protuberance 206 has a generally linear cross-sectional profile, i.e. defining a generally frustoconical shape. However, in other embodiments the protuberance 206 may have a curved or other cross-sectional profile. The protuberance 206 has a first oblique surface 210 on a first axial side of the protuberance 206 and a second oblique surface 212 on a second axial side of the protuberance 206.

Figure 3A:
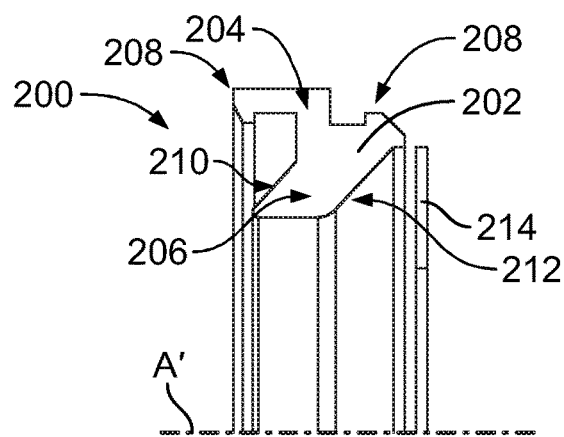
FIGS. 3a-3d are a cross-sectional representation of assembling a bearing assembly according to an embodiment of the present disclosure.

An inner bearing member 214, which may be referred to as a ring, is also provided. The ring 214 is disposed generally proximate the second surface 212 of the protuberance 206. At the outset of assembly, e.g. as illustrated in FIG. 3a, the ring 214 may have a generally planar annular shape, e.g. generally rectangular in cross-section extending generally orthogonal to the axis A'. Advantageously, the ring 214 may thereby be inexpensively formed using extrusion and subsequent cutting to the desired dimension. The ring 214 may be formed of any compliant, low flexural modulus, low-friction material, e.g. polytetrafluoroethylene or polyester.

Figure 3B:
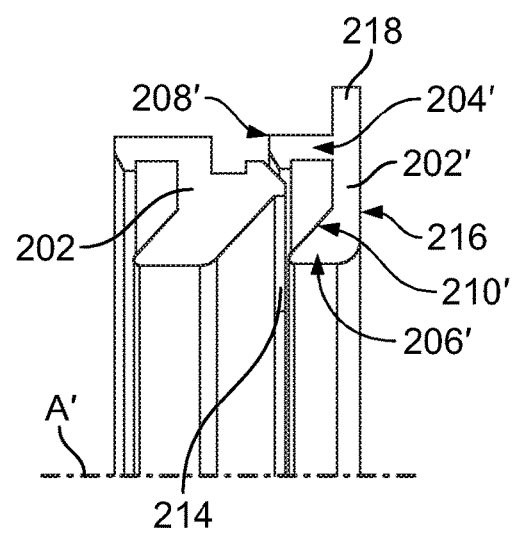

A second race member 202' is provided, as illustrated in FIG. 3b. The second race member 202' includes a connection portion 204' having at least one attachment feature 208' and a protuberance 206' having a first oblique surface 210' on a first axial side of the protuberance 206'. The second race member 202' is configured broadly similarly to the race member 202. In the illustrated embodiment the second race member 202' is configured as an endcap having a generally planar end surface 216 and an end indicator tab 218. Such an embodiment may more clearly indicate an end portion of the bearing assembly 200. However, in other embodiments the second race member 202' may be identical to the race member 202.

The second race member 202' is disposed proximate the race member 202 with the ring 214 disposed therebetween. More particularly, the ring 214 is disposed between the second surface 212 of the protuberance 206 and the first surface 210' of the protuberance 206'.

Figure 3C:
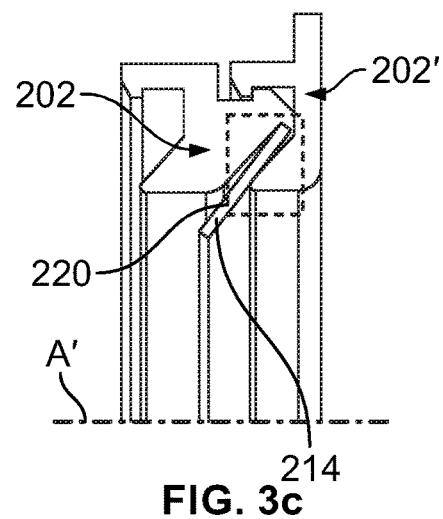

The connection portion 204' of the second race member 202' is engaged with the connection portion 204 of the race member 202, as illustrated in FIG. 3c. This may be performed through engagement of the respective attachment features 208, 208'. In the illustrated embodiment, this comprises interlocking of the aforementioned interlockable tabs; however, in other embodiments engagement may be performed in any suitable fashion according to the configuration of the attachment features 208, 208'.

An oblique channel 220 is thereby defined between the second surface 212 of the protuberance 206 and the first surface 210' of the protuberance 206'. The channel 220 is shown in further detail in FIG. 3d. In the illustrated embodiment, the channel 220 extends generally linearly in cross-section, and thereby defines a generally frustoconical channel between the race members 202, 202'.

The ring 214, being disposed in the channel 220, is thereby shaped into a new profile in conformance with that of the channel 220. In the illustrated embodiment, the ring 214 is thereby shaped into a frustoconical profile.

Figure 3D:
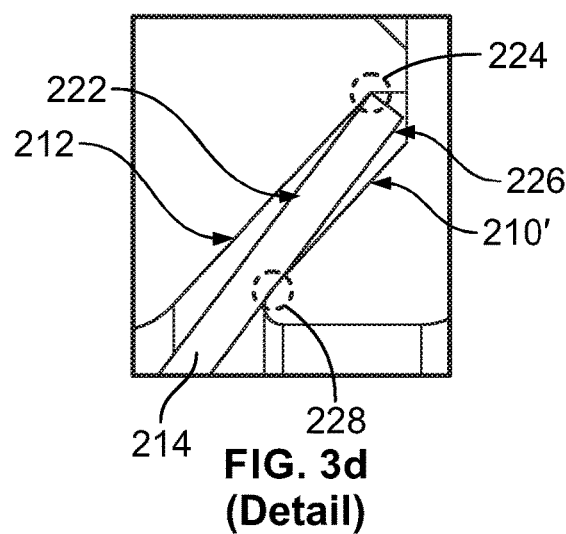

As may be seen in detail in FIG. 3d, a first side 222 of the ring 214 contacts the second surface 212 of the protuberance 206 at a first interface 224, and a second side 226 of the ring 214 contacts the first surface 210' of the protuberance 206' at a second interface 228. Moreover, the ring 214 contacts the shaft at a third interface, as will be discussed in further detail with respect to FIG. 4.

While FIGS. 3a through 3d omit the shaft for purposes of simplifying the drawings, one of ordinary skill in the art will appreciate that in practice, ring 214 and the race members 202, 202' may be disposed about the shaft prior to connection of the race members 202, 202'. Ergonomic aspects of assembly are thereby improved, as each component may be slid onto the shaft and positioned in a desired location relative the shaft prior to assembly.

While the assembly illustrated in FIG. 3 comprises only two race members and a single ring, the process can be repeated to include additional race members and rings to form a labyrinth bearing assembly 300 as illustrated in FIG. 4. The labyrinth bearing assembly 300 is disposed about a shaft 330 having an axis of rotation A". The shaft 330 may define the shaft 12 depicted in FIG. 1, or any other suitable shaft in an automotive or non-automotive context.

The labyrinth bearing assembly 300 comprises a plurality of bearing members 302 defining a plurality of channels 320 having rings 314 disposed therein. The respective channels 320 and rings 314 are configured generally as depicted with respect to the channels 220 and rings 214 of FIGS. 3a-3d, e.g. having respective first and second interfaces 324, 328 between respective first and second sides of the rings 314 and surfaces of the channels 320. Moreover, the respective rings 314 contact the shaft 330 at respective third interfaces 332.

The respective rings 314 of the labyrinth bearing assembly 300 decouple or separate the respective third interfaces 332 from the first and second interfaces 324, 328 in an axial direction. Stated differently, for a given channel 320 the respective third interface 332 is located at a distinct axial position from the axial position(s) of the first and second interfaces 324, 328. As will be appreciated by one of ordinary skill in the art, the relative axial positions of the first and second interfaces 324, 328 will vary based on the shape and cant of the channels 320 relative to the axis A".

Longitudinally decoupling the third interface 332 from the first and second interfaces 324, 328 facilitates an interference fit at both interface locations and decouples the turning friction between the rings 314 and the race members 302 and between the rings 314 and the shaft 330.

Furthermore, longitudinally decoupling the third interface 332 from the first and second interfaces 324, 328 increases seal performance of the bearing assembly 200 by minimizing the gap at the bearing member 216 and race 212 interface, as well as by providing a tortuous path among the plurality of channels 320.

As will be appreciated by one of ordinary skill in the art, the quantity of rings 314 and race members 302 may vary according to the desired characteristics for a given bearing assembly 302. Moreover, because the race members 302 have a common cross-sectional profile, they are interchangeable and may be freely used to create a modular bearing assembly.

Additional variations are also contemplated within the scope of the present disclosure. As a non-limiting example, one or more intermediate members may be provided between coupled race members, such that a plurality of oblique passages are provided between adjacent race members. A corresponding plurality of ring members may be provided therein. Other variations are likewise possible.

As may be seen, the present disclosure provides a bearing assembly having low turning torque and improved ergonomic assembly characteristics relative to known bearing designs.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A bearing assembly comprising:
   a first race member having a first annular body with a first inner diameter and a first outer diameter, the first race member having a first attachment feature and a first protuberance extending inboard of the first attachment feature;
   a second race member having a second annular body with a second inner diameter and a second outer diameter, the second race member having a second attachment feature and a second protuberance extending inboard of the second attachment feature, the first attachment feature being coupled to the second attachment feature such that the first protuberance is spaced axially from the second protuberance with a channel defined therebetween, the channel extending obliquely relative to a central axis of the first race member and the second race member; and
   an annular frustoconical ring member disposed in the channel, the ring member extending obliquely relative to the central axis.

2. The bearing assembly of claim 1, wherein the second race member further comprises a third attachment feature, the assembly further comprising:
   a third race member having a third annular body with a third inner diameter and a third outer diameter, the third race member having a fourth attachment feature and a third protuberance extending inboard of the fourth attachment feature, the fourth attachment feature being coupled to the third attachment feature such that the third protuberance is spaced axially from the second protuberance with a second channel defined therebetween, the second channel extending obliquely relative to the central axis; and
   a second annular frustoconical ring member disposed in the second channel, the second ring member extending obliquely relative to the central axis.

3. The bearing assembly of claim 1, further comprising a rotatable shaft, the ring member being disposed about and having an interface with the rotatable shaft.

4. The bearing assembly of claim 3, wherein the ring member has a second interface with the first protuberance and a third interface with the second protuberance.

5. The bearing assembly of claim 1, wherein the ring member comprises polytetrafluoroethylene or polyester.

6. The bearing assembly of claim 1, wherein the first attachment feature comprises a first resilient interlockable tab and the second attachment features comprises a second resilient interlockable tab.

7. The bearing assembly of claim 1, wherein the first race member and the second race member have a same cross-sectional profile.

8. A method of assembly comprising:
   providing a rotatable shaft;
   disposing a first annular race member about the shaft at a first axial location, the first race member having a first attachment feature and a first protuberance extending inboard of the first attachment feature;
   disposing an annular ring member about the shaft proximate the first protuberance;
   disposing a second annular race member about the shaft at a second axial location, the second race member having a second attachment feature and a second protuberance extending inboard of the second attachment feature; and
   coupling the first attachment feature to the second attachment feature to secure the first race member to the second race member with the ring member therebetween, wherein the first protuberance and the second protuberance cooperatively define a channel therebetween with the ring member disposed therein.

9. The method of claim 8, wherein the second annular race member has a third attachment feature, the method further comprising:
   disposing a second annular ring member about the shaft proximate the second protuberance;
   disposing a third annular race member about the shaft at a third axial location, the third race member having a fourth attachment feature and a third protuberance extending inboard of the third attachment feature; and
   coupling the third attachment feature to the fourth attachment feature to secure the second race member to the third race member with the second ring member therebetween, wherein the second protuberance and the third protuberance cooperatively define a second channel therebetween with the second ring member disposed therein.

10. The method of claim 8, wherein the ring member has a first interface with the rotating shaft, a second interface with the first protuberance, and a third interface with the second protuberance.

11. The method of claim 8, wherein the ring member comprises polytetrafluoroethylene or polyester.

12. The method of claim 8, wherein the first attachment feature comprises a first resilient interlockable tab and the second attachment features comprises a second resilient interlockable tab, and wherein coupling the first attachment feature to the second attachment feature comprises interlocking the first and second resilient tabs.

13. The method of claim 8, wherein the first race member and the second race member have a same cross-sectional profile.

14. An automotive vehicle comprising:
   a rotating shaft;
   a first race member having a first annular body disposed about the rotating shaft, the first race member having a first inner diameter and a first outer diameter, the first race member having a first attachment feature and a first protuberance extending inboard of the first attachment feature;
   a second race member having a second annular body disposed about the rotating shaft, the second race member having a second inner diameter and a second outer diameter, the second race member having a second attachment feature and a second protuberance extending inboard of the second attachment feature, the first attachment feature being coupled to the second attachment feature such that the first protuberance is spaced axially from the second protuberance with a channel defined therebetween, the channel extending obliquely relative to a central axis of the first race member and the second race member; and an annular frustoconical ring member disposed about the rotating shaft and positioned in the channel, the ring member extending obliquely relative to the central axis.

15. The vehicle of claim 14, wherein the second race member further comprises a third attachment feature, the vehicle further comprising:

a third race member having a third annular body with a third inner diameter and a third outer diameter, the third race member having a fourth attachment feature and a third protuberance extending inboard of the fourth attachment feature, the fourth attachment feature being coupled to the third attachment feature such that the third protuberance is spaced axially from the second protuberance with a second channel defined therebetween, the second channel extending obliquely relative to the central axis; and a second annular frustoconical ring member disposed in the second channel, the second ring member extending obliquely relative to the central axis.

16. The vehicle of claim 14, wherein the rotatable shaft comprises a steering shaft extending from a steering wheel to a steering rack.

17. The vehicle of claim 14, wherein the ring member has a first interface with the rotatable shaft, a second interface with the first protuberance and a third interface with the second protuberance.

* * * * *